(12) United States Patent
Swistock (10) Patent No.: US 6,389,115 B1
(45) Date of Patent: May 14, 2002

(54) SYSTEM AND METHOD FOR NOTIFYING A USER OF VOICE MAIL MESSAGES AT A CELL PHONE SITE

(75) Inventor: Christopher Swistock, Ashburn, VA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/204,066

(22) Filed: Dec. 3, 1998

(51) Int. Cl.[7] .............................................. H04M 1/64
(52) U.S. Cl. .................................... 379/88.12; 455/413
(58) Field of Search ............................. 455/31.2, 38.4, 455/401, 403, 412, 413, 415, 422, 425, 426, 428, 461, 462, 466, 554, 555; 379/88.11–88.15, 88.17, 88.18, 88.22–88.25, 88.27, 207.13; 370/351–356; 709/201–203

(56) References Cited

U.S. PATENT DOCUMENTS

| | | | | |
|---|---|---|---|---|
| 5,995,606 A | * | 11/1999 | Civanlar et al. ....... | 379/207.13 |
| 6,002,750 A | * | 12/1999 | Ertz ........................ | 379/88.12 |
| 6,006,087 A | * | 12/1999 | Amin ........................ | 455/413 |
| 6,181,781 B1 | * | 1/2001 | Porter et al. ............. | 379/88.17 |
| 6,188,887 B1 | * | 2/2001 | Joong et al. ................ | 455/417 |
| 6,201,858 B1 | * | 3/2001 | Sundhar ................... | 379/88.12 |
| 6,212,261 B1 | * | 4/2001 | Meubus et al. .......... | 379/88.12 |

* cited by examiner

Primary Examiner—Fan Tsang
Assistant Examiner—Roland G. Foster
(74) Attorney, Agent, or Firm—McDonnell Boehnen Hulbert & Berghoff (57) ABSTRACT

System and method for providing a waiting indicator at a cell phone indicating that a voice mail message is available at a remote voice mail system. The system is placed at a voice mail system site and interacts with the voice mail system using industry standard signals, such as TAP and SMDI signals. After gathering the information provided by the voice mail system, the present invention forwards data over the internet to a cell server associated with cell phone sites. The cell phone server in turn provides for a message waiting indicator at the appropriate cell phone.

7 Claims, 8 Drawing Sheets

SYSTEM AND METHOD FOR NOTIFYING A USER OF VOICE MAIL MESSAGES AT A CELL PHONE SITE

BACKGROUND OF THE INVENTION

1. Field of the Invention

The present invention relates to voice mail messaging, and more particularly to a system and method that allows a user to be notified of voice mail messages at a cell phone site.

2. Discussion of Related Art

Many people have voice mail systems at their place of work. When messages are left on the voice mail at the business site, the user is typically notified of this new message by a message waiting indicator on the telephone at the business site. In some systems, if the user is not at the site to see the message indicator, the user has no way of knowing of the voice mail and the user must periodically call the business site and remotely access the voice mail system to check for messages.

Some current systems allow for a user to be paged when voice mail is left at their voice mail station. In these systems the voice mail system outputs information using a protocol standard in the communications industry called Telocator Alpha Numeric Paging Protocol (TAP). A TAP message is a signal that typically includes the voice mail number, a page phone number, and the number of messages. This signal is output to a modem placing a telephone call to a paging system leaving a message that a message is waiting, the number of messages and possibly the voice mail number. Most current voice mail systems have a line that outputs the TAP protocol information.

Another existing voice mail-paging system uses In-Band signaling. In-Band signaling is a protocol that many voice mail systems have that causes the voice mail system to make a phone call to a paging system and plays a dual tone multi-frequency (DTMF) signal that may include an indication of a new message and the number of messages previously recorded in the system.

Currently, there is no system to provide a message waiting indicator for a remote voice mail system to a cell telephone. It would be desirable to have a signal at a cell telephone indicating that messages are present at a user's voice mail system at a remote voice mail site without requiring extensive changes to existing voice mail systems. This would allow for a user to have a message waiting indicator, such as a light, on their cell phone. A cell phone user may also have a display on the cell phone that includes alpha numeric data showing the existence of messages and the number of messages.

SUMMARY OF THE INVENTION

In accordance with the present invention, a system and method allow for a message waiting indicator to be displayed at a cell phone site indicating that a voice mail message is available at a remote voice mail system. The present invention includes a system that is placed at a voice mail system site and interacts with the voice mail system using industry standard signals, such as TAP and SMDI signals. After gathering the information provided to the voice mail system, the present invention forwards data to a cell server associated with cell phone sites which in turn provides for a message waiting indicator at the appropriate cell phone.

The present invention includes a premise controller that receives signals from the voice mail system when messages are left in voice mail boxes at the voice mail system. The premise controller includes structure for sending a message waiting indicator to an external phone server using the internet.

In a first embodiment, the voice mail system sends SMDI signals to the premise controller.

In a second embodiment, the voice mail system sends SMDI and TAP signals to the premise controller.

In a third embodiment, the voice mail system places a call to the premise controller upon receiving new voice mail. When the premise controller answers, a DTMF code or TAP message is played to the premise controller including a voice mail number, cell phone number, and a number of messages.

BRIEF DESCRIPTION OF THE DRAWINGS

The accompanying drawings, which are incorporated in and constitute a part of this specification, illustrate an embodiment of the invention and, together with the description, explain the advantages and principals of the invention.

In the Drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the pending claims and equivalents.

The invention relates to a system and method for displaying a message waiting indicator or notification to a user of a cell phone to indicate that voice mail messages are waiting at a remote voice mail system site.

Figure 1A:
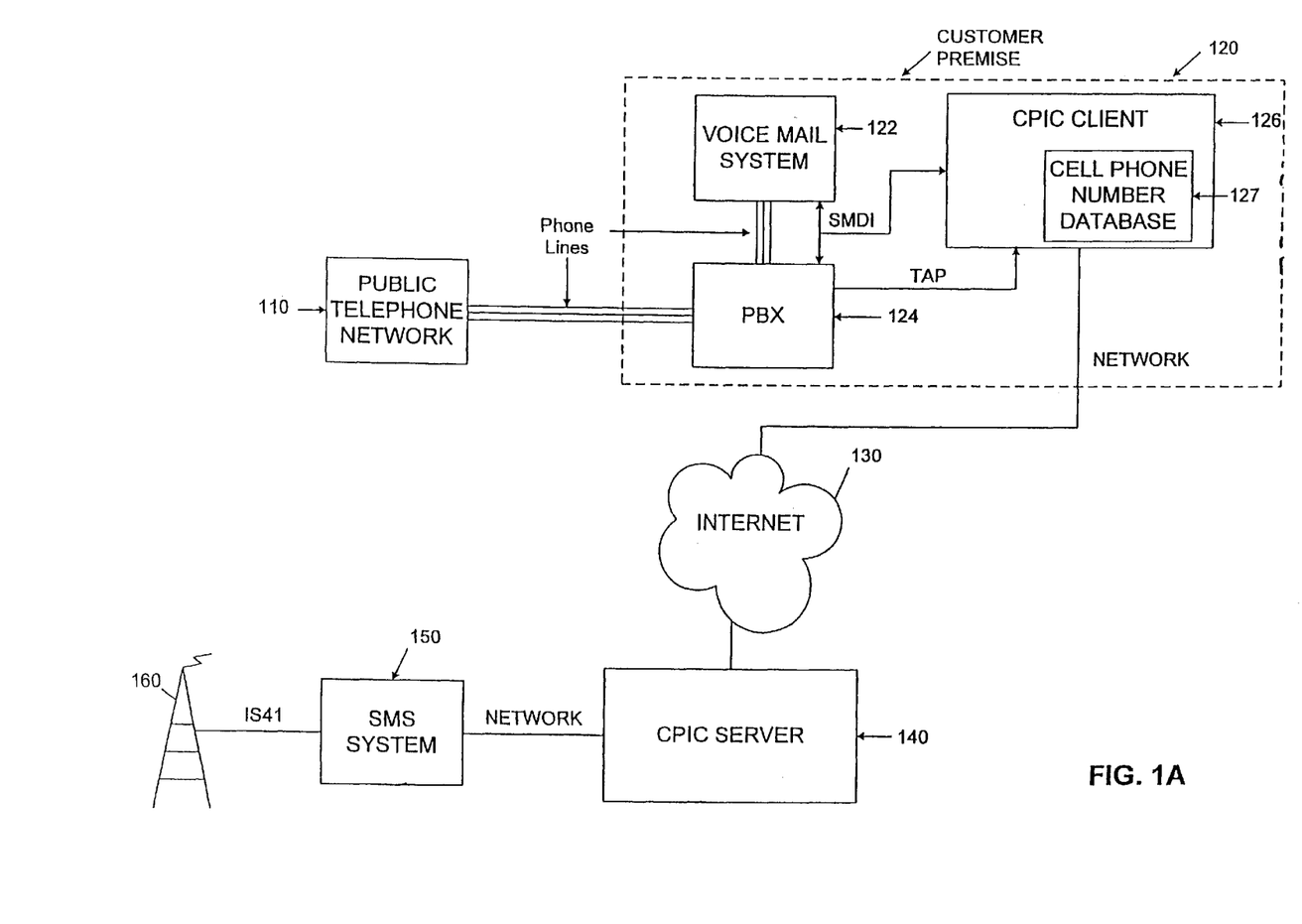
FIG. 1A shows a block diagram of the overall communication system consistent with a first embodiment of the present invention using a combined SMDI and TAP protocol.
Figure 2:
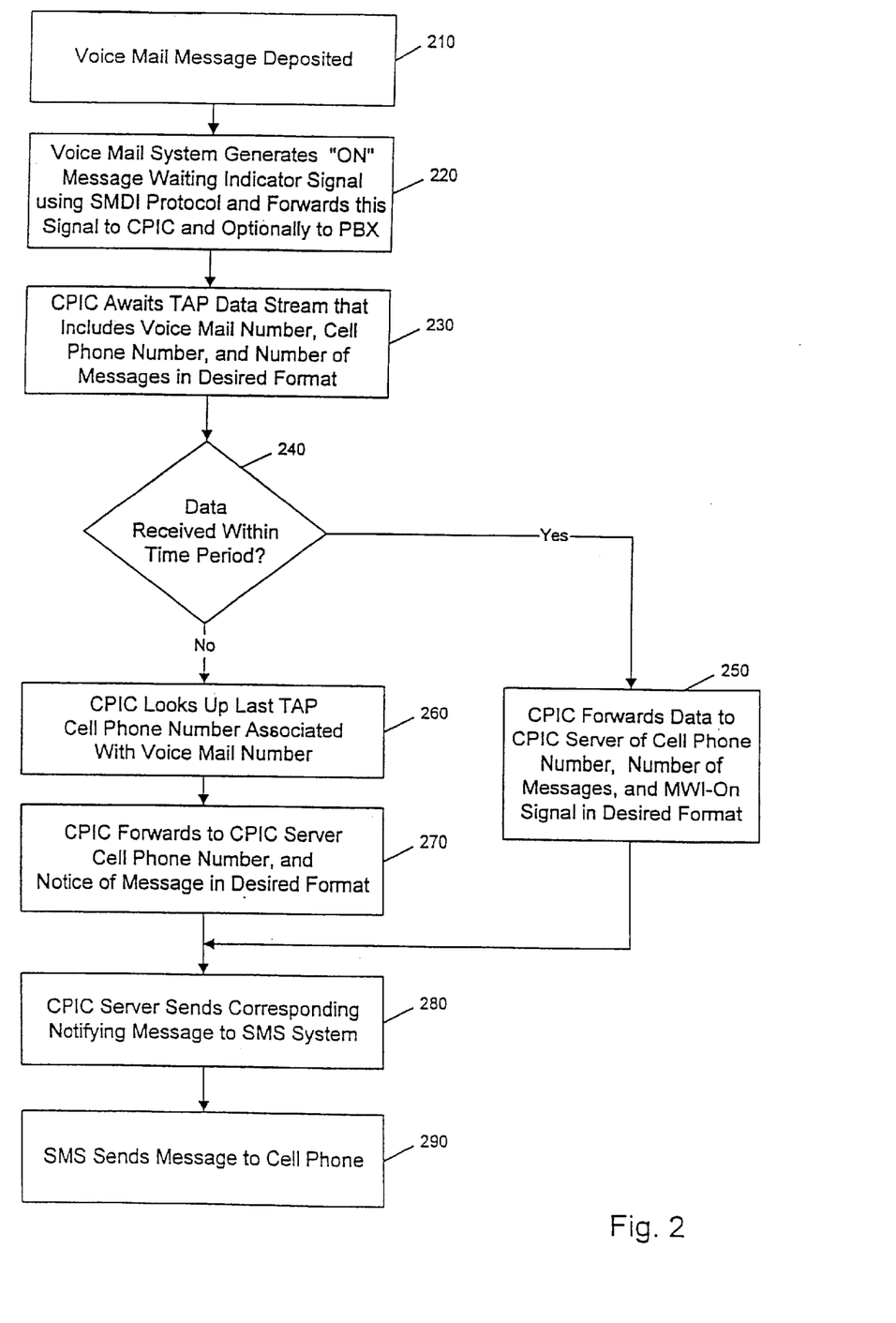
FIG. 2 is a flow chart showing the steps for forwarding a message waiting indicator (MWI-on) signal to a cell phone according to one embodiment of the present invention.
Figure 3:
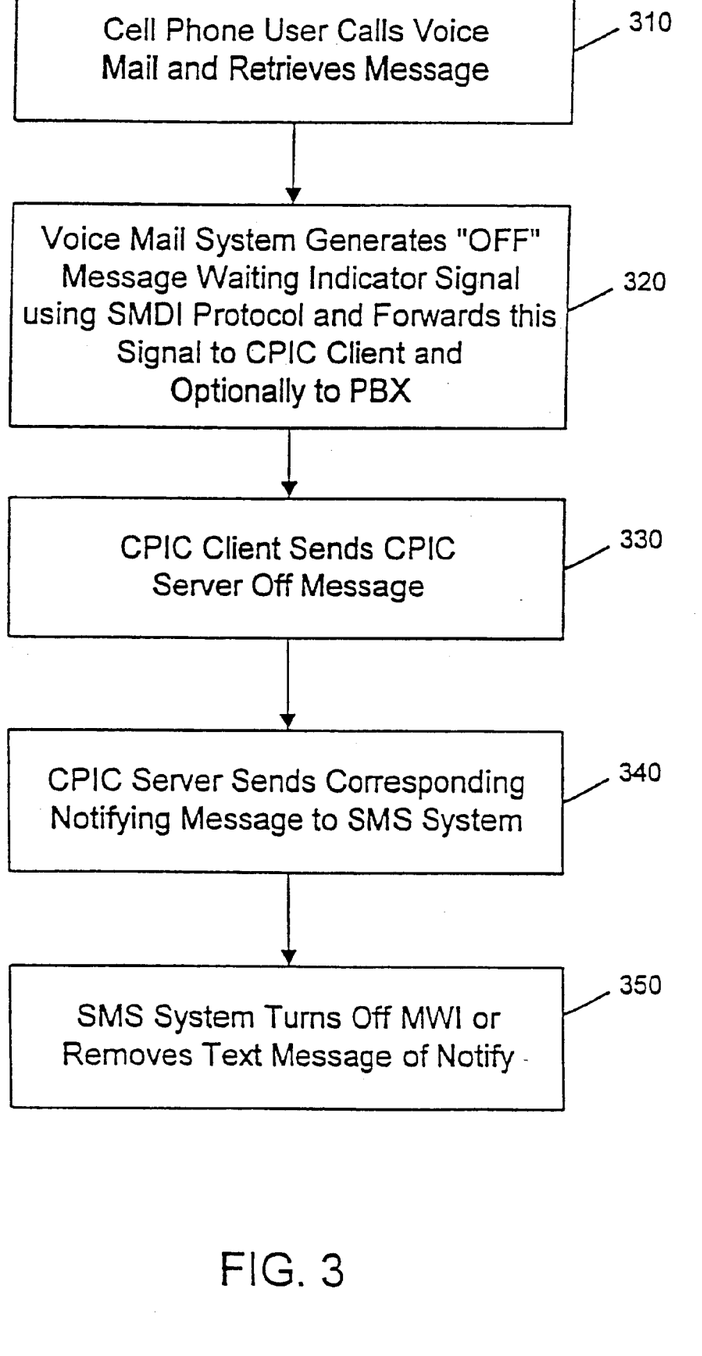
FIG. 3 is a flow chart showing the steps for turning off the message waiting indicator according to the first embodiment of the present invention.

FIG. 1A is a block diagram showing a communications configuration according to a first embodiment of the present invention. FIGS. 2 and 3 are flow charts that show the steps for sending a MWI on and off signal to a cell phone.

Referring to FIG. 1A, public telephone network 110 forwards incoming telephone calls directed to private branch exchange (PBX) 124 at a customer premise 120. PBX 124 directs the calls to extensions within the customer premise 120. PBX 124 decides where to route incoming calls based on the number dialed. PBX 124 also handles redirection of calls to different internal numbers, including the voice mail system 122. If, for instance, a phone is not answered after a predetermined number of rings, PBX 124 reroutes the call to the voice mail system 122. Also, if an extension is forwarded to another number, PBX 124 automatically forwards the call to the forwarded number.

Each time a voice mail message is left on the voice mail system 122, the voice mail system 122 generates an industry standard station message desk interface signal (SMDI) which is a DTMF signal that includes information indicating whether a message waiting indicator (MWI), such as the one at the receiving phone, should be turned on or off (MWI ON or MWI OFF).

Figure 1B:
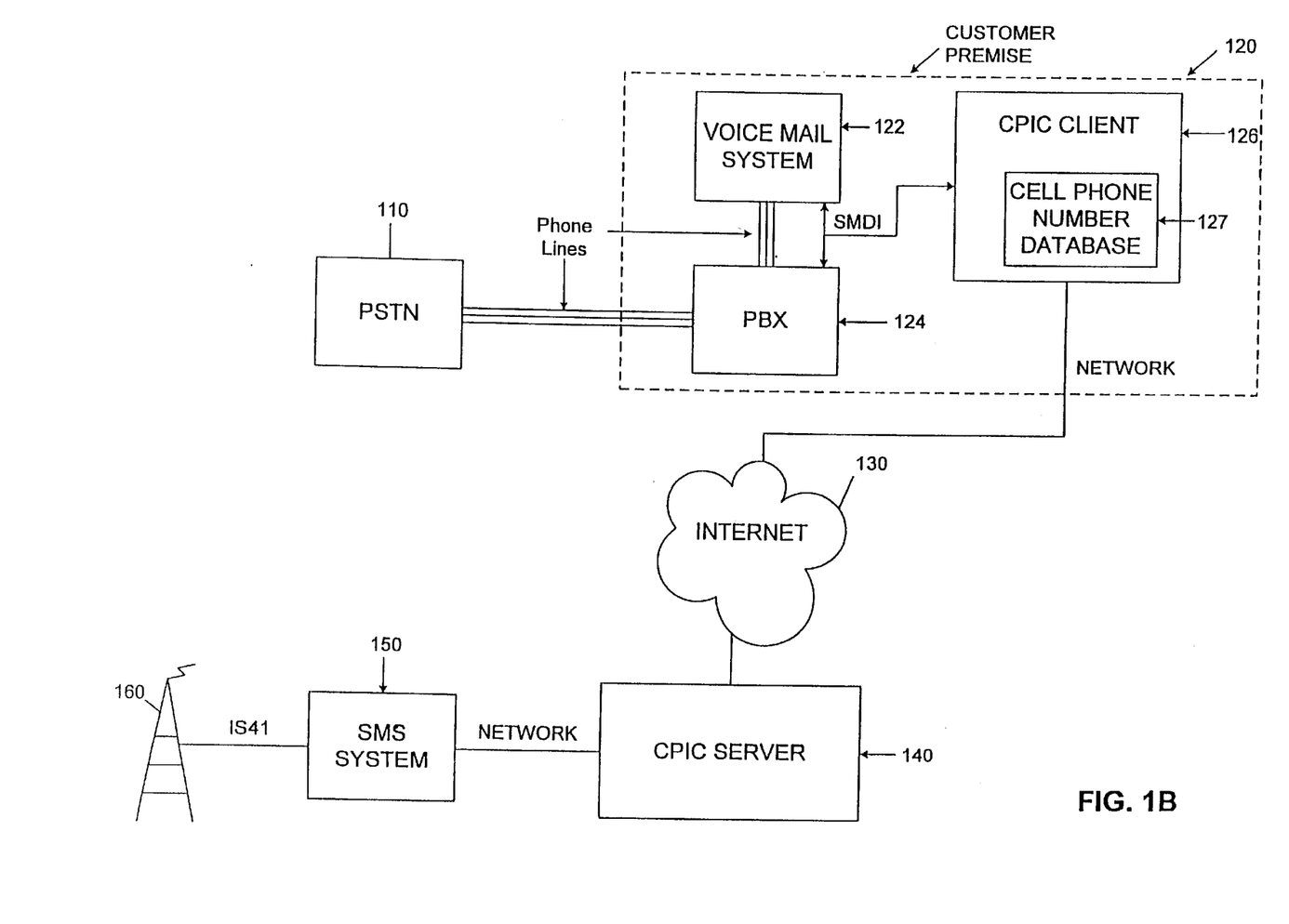
FIG. 1B shows a block diagram of the overall communication system consistent with a second embodiment of the, present invention using a SMDI protocol.

In the embodiment shown in FIGS. 1A and 1B, customer premise internet connector (CPIC) client 126 actively reads all SMDI signals generated by voice mail system 122. From the SMDI signals, CPIC client 126 obtains message waiting indicator signals along with the associated voice mail number. CPIC client 126 sends the MWI signal, optionally the number of new messages, cell phone number and notification format selections to the CPIC server 140 via the internet using, HTTP (a world wide web protocol). CPIC server 140 sends this information through a network to a short message service system (SMS) 150. SMS 150 includes a plurality of servers specific to different cell phone communication systems. A cell phone server at SMS 150 sends a corresponding message to the designated specific cell phone in a cellular network using cell site 160. The protocol for communications between SMS 150 and cell site 160 is a standard communication protocol known as IS-41 which utilizes the standard SS7 TCAP protocol.

As previously discussed, many existing voice mail systems generate an industry standard alpha numeric page signal that is output using the TAP protocol. A TAP message is a DTMF signal and may be configured to include a number of messages, a destination number—in this case a cell phone number, and an associated voice mail number. An example TAP stream data is as follows: 314*7039196922*3*01#. "314" represents the mailbox number, the next number represents a cell phone number, and the "3," represents the new message count and the "01" is a notification format desired. As used in the embodiment shown in FIG. 1A, the TAP message output from the voice mail system 122 is sent to PBX 124 which in turn forwards the message to CPIC client 126. The voice mail system is programmed to automatically call the CPIC client 126 at a predefined number and deliver the TAP message.

From the voice mail system 122's point of view, the TAP signal is a phone call to a modem which in this case the connection is to a modem on the CPIC client 126 through PBX 124. From the CPIC client's 126 point of view, a phone call is received at the CPIC's modem that includes data. PBX 124 is merely routing an internal phone call from one internal line at voice mail system 122 to another internal line at CPIC client 126.

Figure 1C:
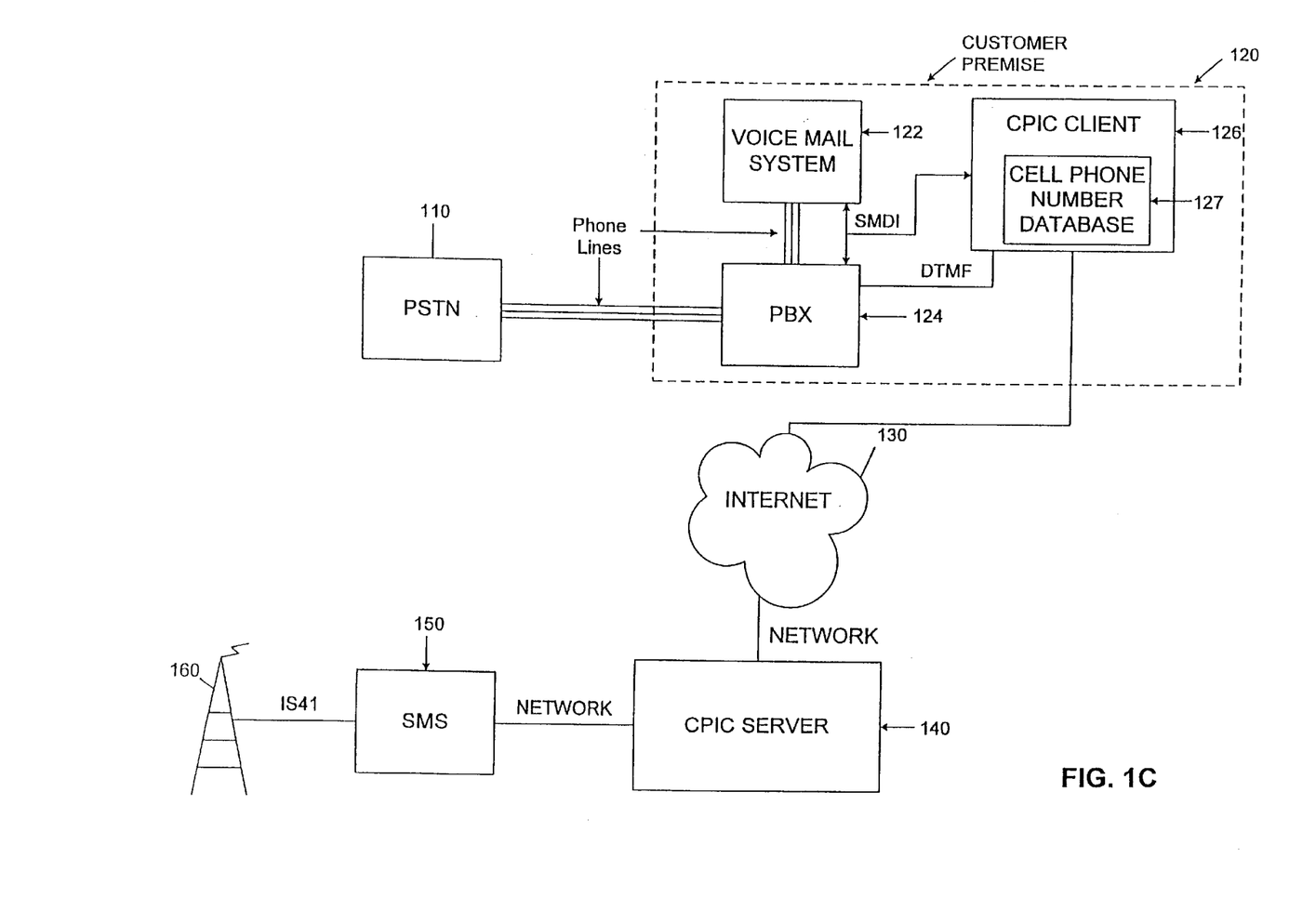
FIG. 1C shows a block diagram of the overall communication system consistent with a third embodiment of the present invention using an in-band signaling protocol.

In one implementation, the CPIC client 126 in FIGS. 1A and 1C may maintain a cell phone number database 127 storing cell phone numbers corresponding to voice mail numbers in the voice mail system 122. A cell phone number database 127 is required in the embodiment shown in FIG. 1B. For each of the embodiments, CPIC client 126 and CPIC server 140 each include a processor and memory storing instructions for performing the steps shown in the flow-charts.

In each of the embodiments shown in FIGS. 1A–1C, a voice mail user may set at the voice mail system 122 the format of notification to be used at the cell phone, such as text display, sound, or message waiting light. The voice mail system 122 will then either include the TAP, DTMF, or another signal to CPIC client 126 indicate the user's choice of the type of notification. This information is passed from CPIC client 126 to CPIC server 140 via internet 130. CPIC server 140 translates the type designed in the signal and passes the translated type of notification to the SMS system 150 to use when notifying the cell phone of the message.

Figure 4:
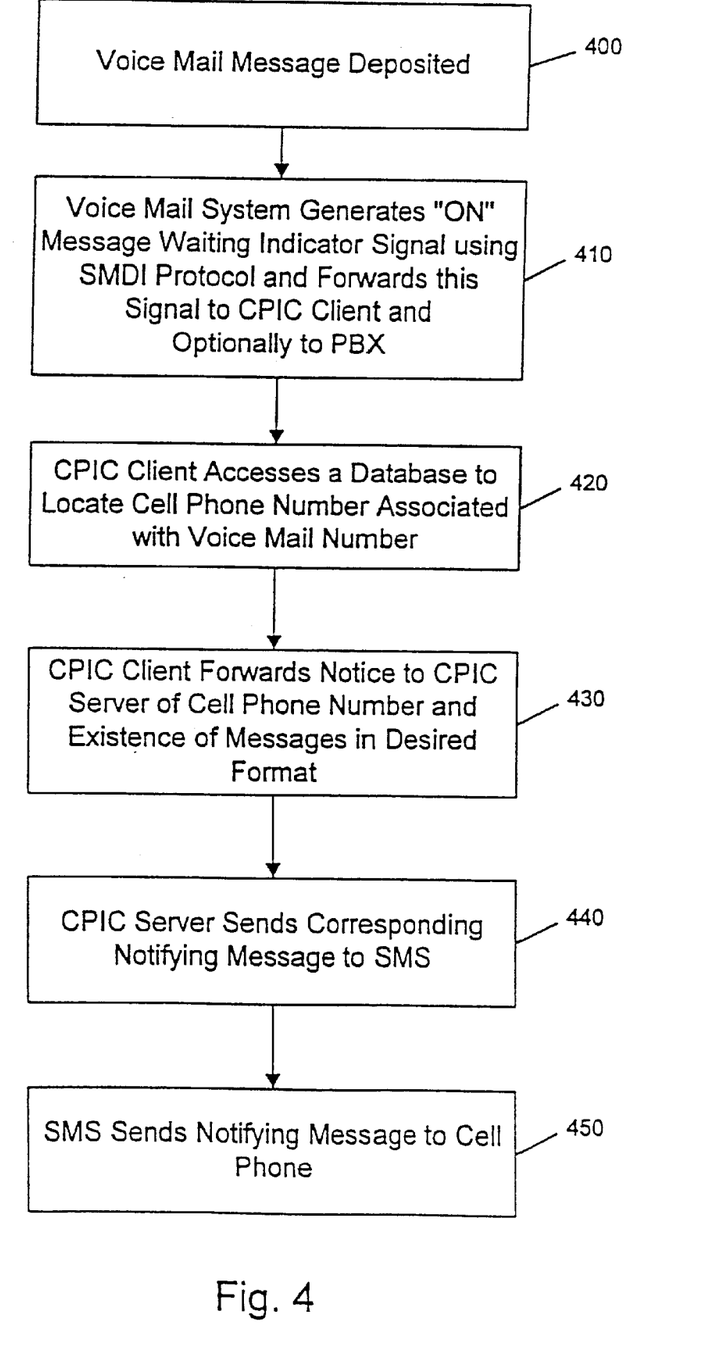
FIG. 4 is a flow chart showing the steps for turning on a message waiting indicator according to the second embodiment of the present invention.
Figure 5:
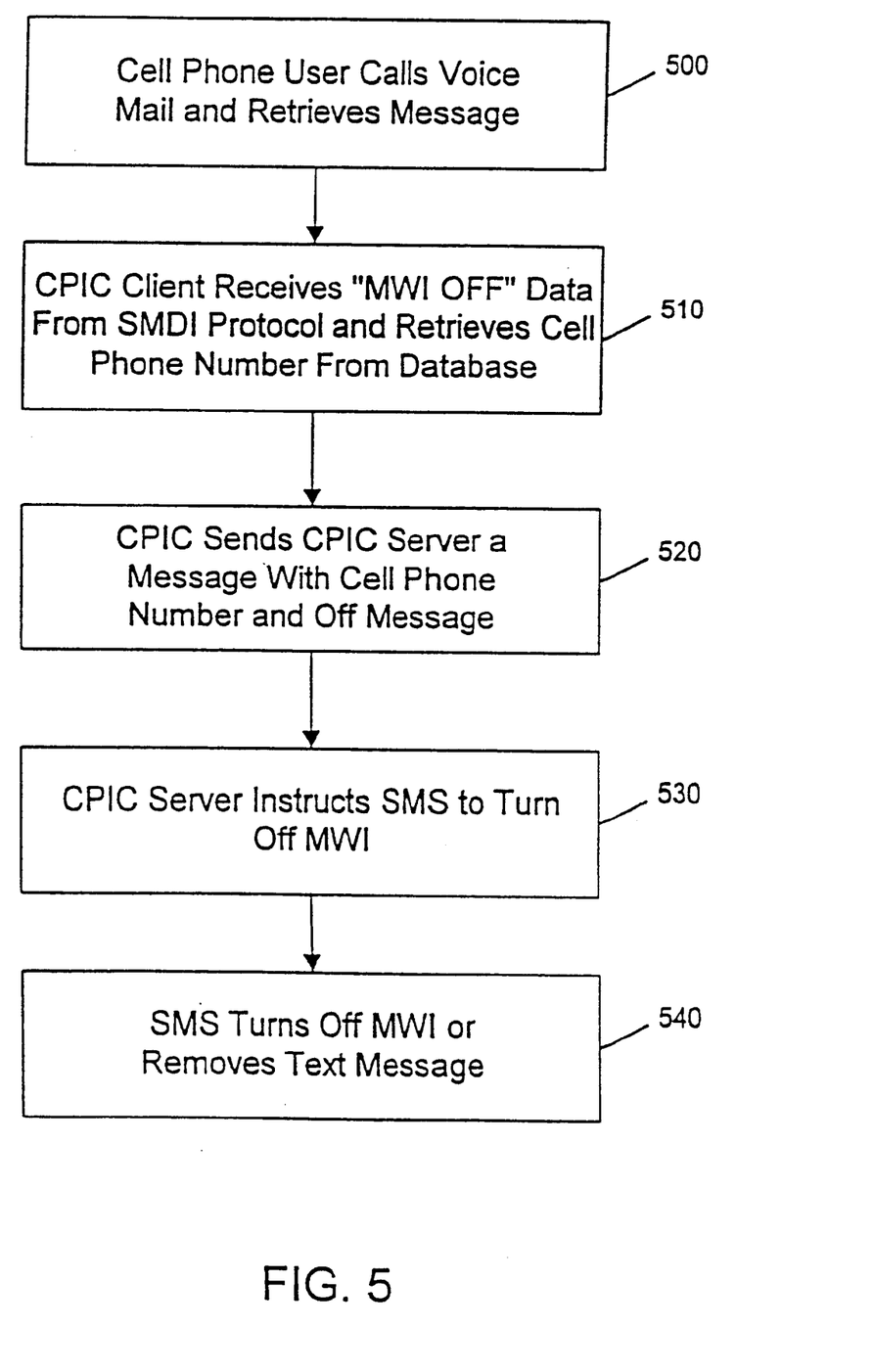
FIG. 5 is a flow chart showing the steps for turning off a message waiting indicator according to the second embodiment of the present invention.

FIG. 1B shows the present invention according to another embodiment of the present invention. The communication system in FIG. 1B includes many of the same elements as in FIG. 1A. A significant difference is that voice mail system 122 does not forward any TAP information to CPIC client 126 and CPIC client 126 has access to a cell phone number database 127 that includes a list of voice mail numbers, their corresponding cell phone numbers and the user's desired notification format. If a user changes an associated cell phone number, the voice mail administrator must update the database. FIGS. 4 and 5 are flow charts of the steps for sending a MWI on or off signal to a cell phone according to the second embodiment of the present invention shown in FIG. 1B.

Figure 6:
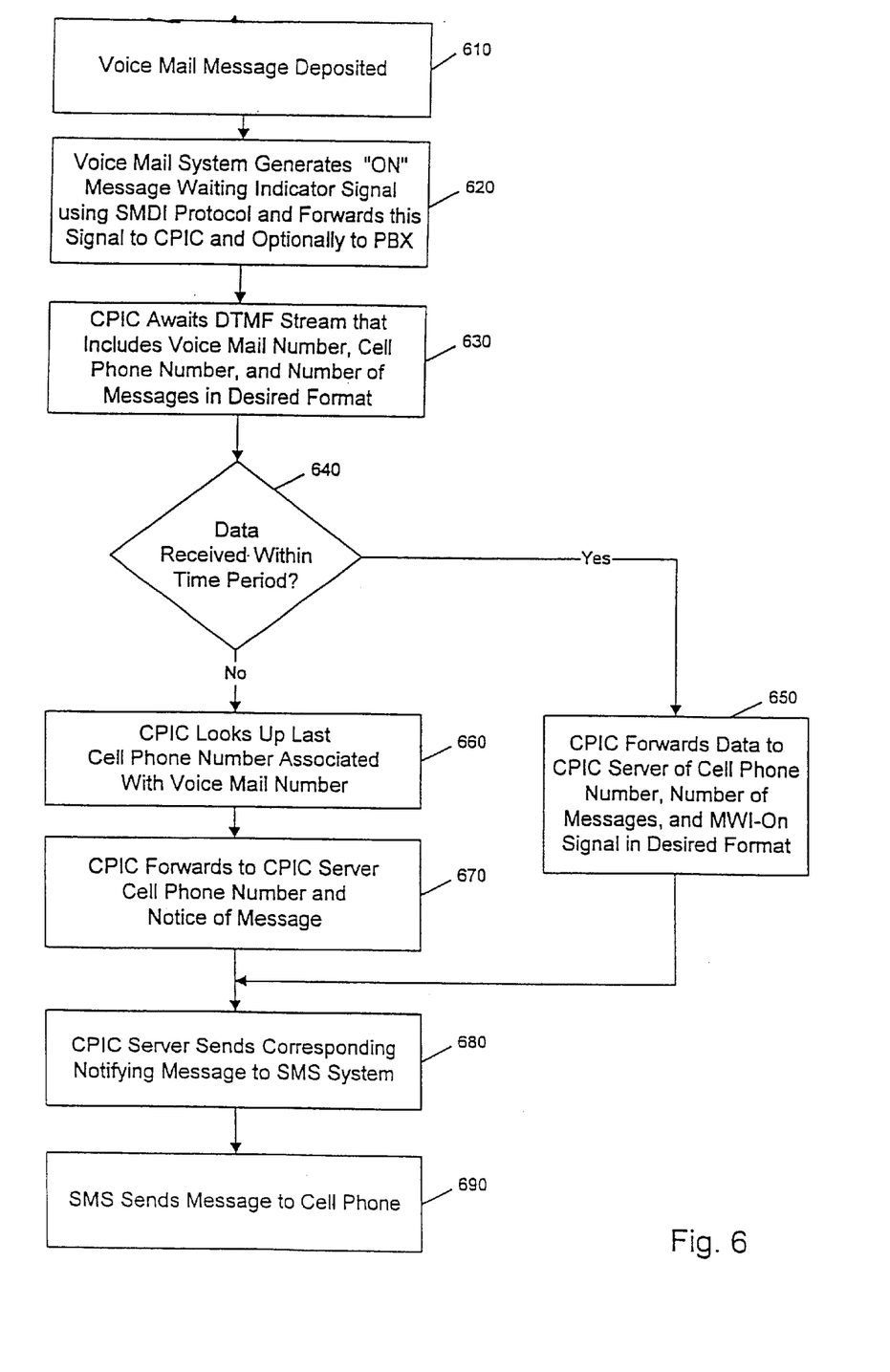
FIG. 6 is a flow chart showing the steps for turning on a message waiting indicator according to the third embodiment of the present invention.

FIG. 1C is a block diagram showing the communication system according to a third embodiment of the present invention. This embodiment includes many of the same elements as FIG. 1A; however, the voice mail system does not send TAP information to the PBX 124 and CPIC client 126. Instead, the voice mail system 122 uses an in-band signaling protocol to send information to the CPIC client 126 via the PBX 124. FIG. 6 is a flow chart showing the steps of forwarding a message waiting indication to the cellular network according to the third embodiment of the present invention shown in FIG. 1C.

THE COMBINED SMDI/TAP COMMUNICATIONS SYSTEM

FIGS. 2 and 3 are flow charts showing the steps for turning on and off a message indicator associated with a cell phone using a cellular network according to the first embodiment of the present invention using the communications network shown in FIG. 1A.

Beginning with FIG. 2, a voice mail message is deposited in a voice mail box at voice mail system 122 (step 210). Voice mail system 122 generates a message waiting indicator signal, MWI-on, using the SMDI protocol and forwards this signal along with the voice mail number to CPIC client 126. CPIC client 126 awaits a TAP data stream that includes the voice mail number, a cell phone number, the number of messages (step 230) and the user's desired notification format. CPIC client 126 determines whether the TAP data has been received within a given time period, such as two minutes (step 240). If CPIC client 126 receives the TAP data, the cell phone number, number of messages, an MWI-on signal and the user's desired notification format are sent by CPIC client 126 to CPIC server 140 (step 250).

If CPIC client 126 does not receive the TAP data within the predetermined time period, then CPIC client 126 looks up the current voice mail number provided by SMDI in the cell phone number database 127 to determine a cell phone number associated with the voice mail number (step 260). If there is no corresponding cell phone number, then the message waiting indication cannot be forwarded to any cell phone. If there is a corresponding cell phone number, CPIC client 126 forwards to CPIC server 140, a cell phone number, a MWI-on signal and desired notification format (step 270). The number of messages cannot be sent in step 270 since the SMDI data does not include this information and the TAP signal was not received.

CPIC server 140 sends any received information to the SMS 150 (step 280). SMS 150 sends the information to the appropriate cell phone in the cellular network associated with cell site 160 (step 290). The cell phone in the cellular network will indicate that a message is received by a text message on a display screen or lighting a message waiting indicator.

FIG. 3 shows the steps for turning off a message waiting indication at a cell phone. A user will call directly into the voice mail system 122 to retrieve messages (step 310). Voice mail system 122 generates a MWI-off signal using the SMDI protocol and forwards the same along with the voice mail number to CPIC client 126 and optionally to PBX 124 (step 320). CPIC client 126 forwards to the CPIC server 140, a cell phone number and a MWI-off signal (step 330). CPIC server 140 sends the SMS system 150 a MWI-off message (step 340). SMS system 150 instructs the cell phone to turn off the message waiting indicator or delete the text message (step 350).

SMDI SYSTEM

FIG. 1B shows an embodiment of the present invention in which the communications network only includes a SMDI interface between the voice mail system and CPIC client 126. FIGS. 4 and 5 are flow charts showing the steps for turning an MWI signal on and off corresponding to this embodiment.

As shown in FIG. 4, after a voice mail message is deposited in voice mail system 122 (step 400), the voice mail system 122 generates a message waiting indicator signal, MWI-on, using the SMDI protocol and forwards the same along with a voice mail number to CPIC client 126 and optionally to PBX 123 (step 410). CPIC client 126 accesses cell phone number database 127 to locate a cell phone number associated with the identified voice mail number (step 420). CPIC client 126 forwards a notice to internet 130 of the cell phone number and the MWI-on message and desired notification format (step 430). CPIC client 126 does not forward a number of messages because the SMDI data only includes an indication of MWI-on and does not include a number of messages as provided for in TAP data. CPIC server 140 sends a corresponding MWI-on message to SMS system (step 440). SMS system 150 sends the notifying message using 160 to the cell phone identified by the cell phone number (step 450).

FIG. 5 shows the steps of turning off a message indicator according to this embodiment. A user calls into voice mail system 122 and retrieves any new messages (step 500). Voice mail system 122 generates a message waiting indicator signal, MWI-off, using the SMDI protocol. CPIC client 126 receives the MWI-off signal and voice mail number from the voice mail system 122 and accesses cell phone number database 127 to locate a cell phone number associated with the identified voice mail number (step 510). CPIC client 126 forwards a notice to CPIC server 140 of the cell phone number and the MWI-off message (step 520). CPIC server 140 sends a corresponding MWI-off message to the SMS system 150 (step 530). SMS 150 instructs an associated cell phone to turn off the message waiting indicator or delete any corresponding text (step 540).

IN BAND SIGNALING SYSTEM

FIG. 1C shows the third embodiment of the present invention that includes many of the elements of FIG. 1A except that a TAP protocol is not used. Alternatively, this embodiment uses an in-band signaling protocol.

FIG. 6 shows the steps corresponding to this embodiment. A voice mail message is deposited in a voice mail box at voice mail system 122 (step 610). Voice mail system 122 generates a message waiting indicator signal, MWI-on, using the SMDI protocol and forwards this signal along with the voice mail number to CPIC client 126 and optionally to PBX 124 (step 620). CPIC client 126 awaits a DTMF data stream that includes the voice mail number, a cell phone number, a number of messages, and desired notification format (step 630). CPIC client 126 determines whether the DTMF stream has been received within a given time period, such as two minutes (step 640). If CPIC client 126 receives the DTMF stream, the cell phone number, number of messages, a MWI-on signal and desired notification format are sent by CPIC client 126 to CPIC server 140 (step 650).

If CPIC client 126 does not receive the DTMF stream within the predetermined time period, then CPIC client 126 looks up the current voice mail number provided by SMDI in the cell phone number database 127 to select a cell phone number associated with the voice mail number (step 660). If there is no corresponding cell phone number, then the message waiting indication cannot be forwarded to any cell phone. If there is a corresponding cell phone number, CPIC client 126 forwards to CPIC server 140, a cell phone number and a MWI-on signal in the user's desired format (step 670). The number of messages cannot be sent in step 270 since the SMDI data does not include this information and the DTMF stream was not received.

CPIC server 140 sends any received information to the SMS 150 (step 680). SMS 150 sends the information to the appropriate cell phone in the cellular network associated with cell site 160 (step 690). The cell phone in the cellular network will indicate that a message is received by a text message on a display screen or lighting a message waiting indicator.

Systems and methods consistent with the principals of the present invention provide a message waiting indicator at a cell phone associated with a remote voice mail number using a combination of various existing communication protocols, in order to provide a voice message indicator at a cell phone and to provide a system that is easy to add to existing voice mail sites. The foregoing description of embodiments of the present invention provides illustration and description, but is not intended to be exhaustive or to limit the invention in the precise form disclosed. Modification; and variations are possible in light of the above teachings or may be acquired from practice of the invention. The scope of the invention is defined by the claims and their equivalents. Although systems and methods consistent with the present invention are described as using various known protocols, other protocols may exist or may be created that may also be used. Additionally, although other aspects of the present invention are described as being stored in the database, one of ordinary skill in the art will appreciate that this data may be stored in many different forms and on many different mediums including a memory, computer readable media, hard disk, floppy disk, or a compact disk reader.

What is claimed is:

1. A premise controller for providing an indication of a voice mail message at a voice mail system associated with a private branch exchange (PBX) to an external phone server, the system comprising:

software processing message waiting signals received from the voice mail system and/or the PBX; and software sending message waiting signals to a client server over a network wherein said client server provides message waiting indicator signals to an external phone server;

wherein said premises controller receives standard station message desk interface signals (SMDI) from the voice mail system, said SMDI signals including a message waiting indicator signal (MWI) and a corresponding voice mail number;

wherein said premise controller is further configured to receive telocator alpha numeric paging protocol signals (TAP) from the voice mail system via the PBX, said TAP signals including a voice mail number, cell phone number, and a number of voice mail messages and desired notification format.

2. The system according to claim 1 wherein the client server forwards the received MWI signal, cell phone number and number of messages to the external phone server.

3. A premise controller for providing an indication of a voice mail message at a voice mail system associated with a private branch exchange (PBX) to an external phone server, the system comprising:

software processing message waiting signals received from the voice mail system and/or the PBX; and software sending message waiting signals to a client server over a network wherein said client server provides message waiting indicator signals to an external phone server; and a cell phone database in communication with the premise controller, said cell phone number database storing cell phone numbers corresponding to voice mail numbers in the voice mail system;

wherein the premise controller includes:
software response to receiving a SMDI signal, for determining whether a TAP signal is received within a predetermined time period;
software searching the cell phone number database for a cell phone number associated with a voice mail number identified in the SMDI signal when the TAP signal is not received with the predetermined time period; and
software forwarding the cell phone number and MWI message to the client server.

4. A premise controller for providing an indication of a voice mail message at a voice mail system associated with a private branch exchange (PBX) to an external phone server, the system comprising:

software processing message waiting signals received from the voice mail system and the PBX;

software sending message waiting signals to a client server over a network wherein said client server provides message waiting indicator signals to an external phone server; and wherein the voice mail system calls the premise controller in response to receiving a new voice mail message and plays a code to the premise controller, wherein the client server forwards data in the code to the external phone server;

wherein said code represents a voice mail number, cell phone number and a number of messages.

5. A method for providing an indication of a voice mail message at a voice mail system associated with a private branch exchange (PBX) to an external phone server, the method comprising the steps of:

receiving standard simplified message desk interface signals (SMDI) from the voice mail system, said SMDI signals including a message waiting indicator signal (MWI) and a corresponding voice mail number;

processing message waiting signals received from the voice mail system and the PBX;

sending message waiting signals to a client server using a network wherein said client server provides message waiting signals to an external phone server; and receiving telocator alpha numeric paging protocol signals (TAP) from the voice mail system via the PBX, said TAP signals including a voice mail number, cell phone number, a number of voice mail messages and desired notification format.

6. A method for providing an indication of a voice mail message at a voice mail system associated with a private branch exchange (PBX) to an external phone server, the method comprising the steps of:

receiving standard station message desk interface signals (SMDI) from the voice mail system at a customer premise controller, said SMDI signals including a message waiting indicator signal (MWI) and a corresponding voice mail number;

processing message waiting signals received from the voice mail system and the PBX;

accessing a cell phone number database storing a list of cell phone numbers associated with voice mail numbers;

sending message waiting signals to a client server using a network wherein said client server provides message waiting signals to an external phone server;

determining, responsive to receiving a SMDI signal, whether a TAP signal if received within a predetermined time period;

searching the cell phone number database for a cell phone number associated with a voice mail number identified in the SMDI signal when the TAP signal is not received within the predetermined time period; and forwarding the cell phone number and WMI message to the external phone server.

7. A method for providing an indication of a voice mail message at a voice mail system associated with a private branch exchange (PBX) to an external phone server, the method comprising the steps of:

processing message waiting signals received from the voice mail system and/or the PBX in a customer premise client; and sending message waiting signals to a client server using a network wherein said client server provides message waiting signals to an external phone server; and wherein the voice mail system further performs the steps of:
calling the customer premise client in response to receiving a new voice mail message;
playing a code to the customer premise client; and
forwarding data in the code to said client server for transmission to an external phone server;
wherein said step of playing a code includes the step of playing a code representing a voice mail number, cell phone number and a number of messages.

* * * * *